United States Patent [19]

Dörling

[11] 4,187,955
[45] Feb. 12, 1980

[54] ARMORED PIPE CONNECTED TO A STEEL LINING OF A PRESTRESSED CAST PRESSURE TANK

[75] Inventor: Rolf Dörling, Gummersbach, Fed. Rep. of Germany

[73] Assignee: L. & C. Steinmüller GmbH, Gummersbach, Fed. Rep. of Germany

[21] Appl. No.: 884,592

[22] Filed: Mar. 8, 1978

[30] Foreign Application Priority Data

Mar. 9, 1977 [DE] Fed. Rep. of Germany ....... 2710176

[51] Int. Cl.² .............................................. B65D 25/14
[52] U.S. Cl. ....................................... 220/435; 220/465
[58] Field of Search ................... 220/465, 3, 468, 435, 220/436; 285/158, 286, 114, 115, 189

[56] References Cited

U.S. PATENT DOCUMENTS

| 1,819,202 | 8/1931 | Roger | 285/286 X |
|---|---|---|---|
| 1,889,874 | 12/1932 | Obert | 285/189 |
| 1,978,608 | 10/1934 | Straty | 285/286 X |
| 1,992,470 | 2/1935 | Carlstrom | 220/465 X |
| 2,088,961 | 8/1937 | Jordan | 285/286 X |
| 2,136,474 | 11/1938 | Straty | 285/286 X |
| 2,463,006 | 3/1949 | Clute | 285/189 X |
| 2,764,427 | 9/1956 | Andrus | 285/158 X |
| 2,981,556 | 4/1961 | Jackson | 285/189 X |
| 3,069,045 | 12/1962 | Haumann et al. | 220/465 X |
| 3,332,709 | 7/1967 | Kowalski | 285/164 X |
| 3,334,780 | 8/1967 | Van Leev et al. | 220/3 |
| 3,392,994 | 7/1968 | Moore | 285/286 X |
| 3,698,589 | 10/1972 | Perry | 220/465 X |
| 4,079,967 | 3/1978 | Schoessow | 285/286 X |

FOREIGN PATENT DOCUMENTS

1950141  4/1971  Fed. Rep. of Germany ........... 285/189

*Primary Examiner*—Allan N. Shoap
*Attorney, Agent, or Firm*—Becker & Becker, Inc.

[57] ABSTRACT

An arrangement for absorbing the thermal expansions of the steel lining of a prestressed cast pressure tank by means of the mounting support of an armored or steel-plated pipe which is passed through the lining and the prestressed cast pressure tank. The steel-plated pipe, at that opening thereof which faces the interior of the tank, has a circumferential, collar-like mounting support which is open toward the interior of the tank. One end of the mounting support is welded to the lining in such a way that the connection is impermeable to gas. The shoulder of the mounting support is positively connected with the cast pressure tank.

2 Claims, 1 Drawing Figure

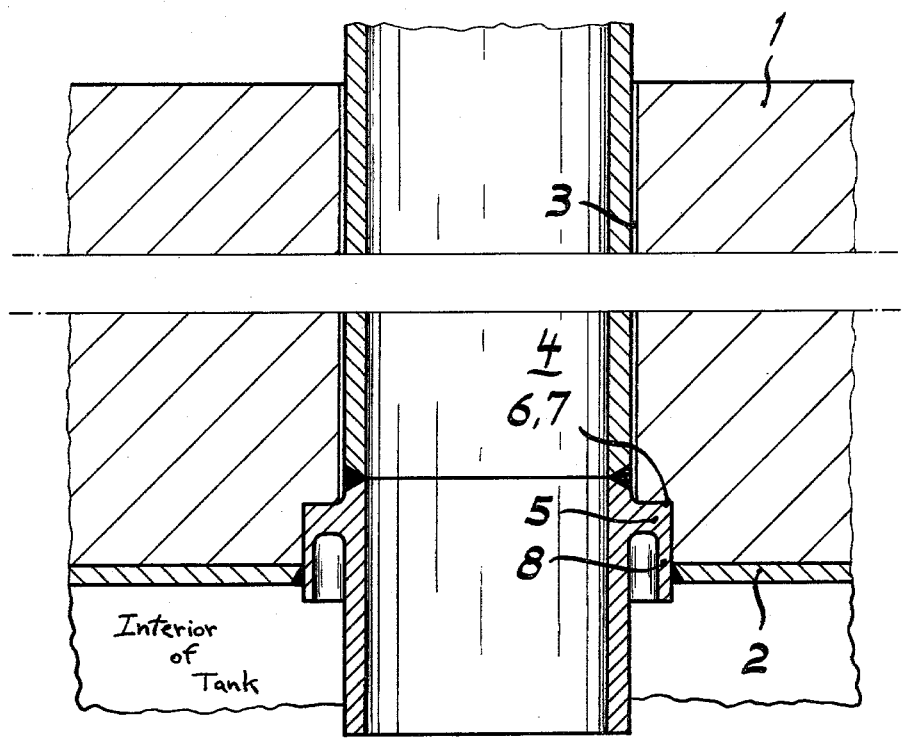

ARMORED PIPE CONNECTED TO A STEEL LINING OF A PRESTRESSED CAST PRESSURE TANK

The present invention relates to an arrangement for absorbing the thermal expansions of the steel lining of a prestressed cast pressure tank by means of the mounting support of an armored or steel-plated pipe which is passed through the lining and the prestressed cast pressure tank.

The supports for mounting steel-plated pipes in a prestressed cast pressure tank having a steel lining must be able to reliably absorb the different thermal expansions of the prestressed cast pressure tank and the steel lining without affecting the inner diameter of the steel-plated pipes. At the same time, care must be taken that the connection between the steel-plated pipe and the lining of the cast pressure tank is impermeable to gas. In addition, the steel-plated pipe must be secured against being ejected or expelled. Prior to the development of the connection pursuant to the present invention, the manufacture of this type of pipe pass-through was not known.

It is an object of the present invention to connect the steel-plated pipe with the steel lining in such a way that the connection is impermeable to gas, while at the same time providing for the absorption of the thermal expansions of the steel lining and also providing for a structurally simple mounting support for the pipe so as to avoid expulsion thereof due to the inner pressure of the tank.

This object and other objects and advantages of the present invention will appear more clearly from the following specification in connection with the accompanying drawing, which shows one specific embodiment of the arrangement pursuant to the present invention.

The arrangement of the present invention is characterized primarily in that the steel-plated pipe, at that opening thereof which faces the interior of the tank, has a circumferential, collar-like mounting support which is open toward the interior of the tank. One end of the mounting support is welded to the lining of the cast pressure tank in such a way that the connection is impermeable to gas. The shoulder of the mounting support is positively connected with the cast pressure container.

Referring now to the drawing in detail, the prestressed cast pressure tank 1, the prestressing system of which is not shown, has a steel lining 2 on that side of the tank which faces the interior of the tank. The armored or steel-plated pipe 4, with the collar 5, is inserted into the opening 3 from the interior of the tank. As a result, the shoulder 6 of the collar 5 rests against the recess 7 of the tank 1. The end 8 of the collar 5, which end 8 faces the interior of the tank, is welded to the steel lining 2 in such a way that the connection is impermeable to gas, i.e., it will not allow gas to pass through. The end 8 of the collar 5 can elastically absorb all expansion movements of the steel lining 2 without affecting the inner diameter of the steel-plated pipe 4.

The decisive advantage of the present invention consists in that the steel-plated pipe can be directly welded to the lining in such a way that the connection is impermeable to gas, and every movement caused by the different thermal expansions of the tank and the steel lining can be conformed to by the pipe without, in so doing, changing the diameter of the steel-plated pipe.

A further advantage consists in that the collar of the present invention is positively connected with the tank, and the steel-plated pipe is prevented from being expelled from the tank as a result of inner pressure.

The present invention is, of course, in no way limited to the specific showing of the drawing, but also encompasses any modifications within the scope of the appended claims.

What I claim is:

1. A pressure vessel having a cast iron wall fitted with a steel lining on the inner surface of said wall and having an opening through the wall and lining, said opening in said cast iron wall being enlarged at its inner end to provide an inwardly facing, radial shoulder on said wall, a pipe extending through the opening in said lining and into said wall, a circumferential collar L-shaped in cross section having a cylindrical portion with a free end, said cylindrical portion and free end being spaced from said pipe, the site end of said collar spaced axially and radially from said free end and integrally connected to said pipe, the cylindrical portion of said collar being welded to said lining so that the weld is spaced from the pipe and from said opposite end of said collar to allow expansion of said lining without affecting the diameter of said pipe, said pipe being in engagement with said radial shoulder on said cast iron wall to prevent outward movement of said pipe.

2. A pressure vessel having a cast iron wall fitted with a steel lining on the inner surface of said wall and having an opening through the wall and lining, said opening in said cast iron wall being enlarged at its inner end to provide an inwardly facing, radial shoulder on said wall, a pipe extending through the opening in said lining and into said wall, a circumferential collar defining an inverted L-shape in cross section having a cylindrical portion with its inner, free end spaced from said pipe and its opposite, outer end axially and radially spaced from said free end and being integrally connected to said pipe, so that the space between said collar and pipe opens inwardly, the cylindrical portion of said collar being welded to said lining so that the weld is spaced from the pipe and from said opposite end of said collar to allow expansion of said lining without affecting the diameter of said pipe, the outer end of said collar integral with said pipe providing a radial shoulder in engagement with said radial shoulder on said cast iron wall to prevent outward movement of said pipe.

* * * * *